US011320646B2

(12) United States Patent
Inoue

(10) Patent No.: US 11,320,646 B2
(45) Date of Patent: May 3, 2022

(54) EYEPIECE LENS AND OPTICAL APPARATUS

(71) Applicant: FUJIFILM Corporation, Tokyo (JP)

(72) Inventor: Kazuki Inoue, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 133 days.

(21) Appl. No.: 16/927,277

(22) Filed: Jul. 13, 2020

(65) Prior Publication Data
US 2021/0026129 A1 Jan. 28, 2021

(30) Foreign Application Priority Data

Jul. 23, 2019 (JP) .............................. JP2019-135273

(51) Int. Cl.
*G02B 25/00* (2006.01)
*G02B 3/04* (2006.01)
(52) U.S. Cl.
CPC .............. *G02B 25/001* (2013.01); *G02B 3/04* (2013.01)

(58) Field of Classification Search
CPC ................................ G02B 25/001; G02B 3/04
USPC ......................................................... 359/645
See application file for complete search history.

(56) References Cited

U.S. PATENT DOCUMENTS 6,181,479 B1   1/2001  Koizumi

FOREIGN PATENT DOCUMENTS

JP       2000-105344 A    4/2000
JP          3335199 B2   10/2002

*Primary Examiner* — William Choi
(74) *Attorney, Agent, or Firm* — Studebaker & Brackett PC

(57) ABSTRACT

An eyepiece lens consists of a first lens group including a cemented lens, a second lens group consisting of one negative lens, and a third lens group consisting of a plurality of positive lenses in order from an object side to an eye side. The eyepiece lens satisfies Conditional Expression: $-1.2 < f/f2 < -0.8$ related to a focal length $f$ of an entire system and a focal length $f2$ of the second lens group.

20 Claims, 5 Drawing Sheets

EXAMPLE 1

EXAMPLE 1

EYEPIECE LENS AND OPTICAL APPARATUS

CROSS-REFERENCE TO RELATED APPLICATIONS

The present application claims priority under 35 U.S.C. § 119 to Japanese Patent Application No. 2019-135273, filed on Jul. 23, 2019. The above application is hereby expressly incorporated by reference, in its entirety, into the present application.

BACKGROUND OF THE INVENTION

1. Field of the Invention

The present disclosure relates to an eyepiece lens and an optical apparatus.

2. Description of the Related Art

In the related art, for example, optical systems disclosed in JP2000-105344A and JP3335199B have been known as an optical system for an eyepiece lens. In JP2000-105344A, an eyepiece lens in which a first lens group having a two-lens composition and a positive refractive power, a second lens group having a two-lens composition, and a third lens group having a two-lens composition are arranged in order from an eye side is disclosed. In JP3335199B, an eyepiece lens that is composed of a first lens group having a negative power and a second lens group having a positive power in order from an objective side and in which an intermediate image of an objective lens is formed between the first lens group and the second lens group is disclosed.

SUMMARY OF THE INVENTION

In the eyepiece lens, an ability to observe a favorable image even in an edge part portion of the image is required. In order to do so, it is desirable to favorably correct both field curvature and distortion. In the eyepiece lens disclosed in JP2000-105344A, there is room for improvement in order to meet high-level requirements for both of the field curvature and the distortion in recent years. In the eyepiece lens disclosed in JP3335199B, there is room for improvement in correction of the distortion.

The present disclosure is conceived in view of the above matter, and an object thereof is to provide an eyepiece lens that has high optical performance and in which various types of aberration including field curvature and distortion are favorably corrected, and an optical apparatus comprising the eyepiece lens.

An eyepiece lens according to one aspect of the present disclosure consists of, in order from an object side to an eye side, a first lens group including a cemented lens, a second lens group consisting of one negative lens, and a third lens group consisting of a plurality of positive lenses, in which in a case where a focal length of an entire system is denoted by f, and a focal length of the second lens group is denoted by f2, Conditional Expression (1) below is satisfied.

$$-1.2 < f/f2 < -0.8 \tag{1}$$

In the eyepiece lens of the aspect, it is preferable that Conditional Expression (1-1) below is satisfied.

$$-1.1 < f/f2 < -0.9 \tag{1-1}$$

In the eyepiece lens of the aspect, in a case where the focal length of the entire system is denoted by f, and a focal length of the positive lens of the third lens group closest to the eye side is denoted by f3e, it is preferable that Conditional Expression (2) below is satisfied, and it is more preferable that Conditional Expression (2-1) below is satisfied.

$$0.59 < f/f3e < 0.8 \tag{2}$$

$$0.6 < f/f3e < 0.79 \tag{2-1}$$

In the eyepiece lens of the aspect, in a case where the focal length of the entire system is denoted by f, and a focal length of the cemented lens is denoted by fc, it is preferable that Conditional Expression (3) below is satisfied, and it is more preferable that Conditional Expression (3-1) below is satisfied.

$$0.68 < f/fc < 0.95 \tag{3}$$

$$0.7 < f/fc < 0.93 \tag{3-1}$$

In the eyepiece lens of the aspect, in a case where the focal length of the entire system is denoted by f, and a focal length of the third lens group is denoted by f3, it is preferable that Conditional Expression (4) below is satisfied, and it is more preferable that Conditional Expression (4-1) below is satisfied.

$$0.8 < f/f3 < 1 \tag{4}$$

$$0.82 < f/f3 < 0.98 \tag{4-1}$$

In the eyepiece lens of the aspect, it is preferable that the cemented lens consists of one negative lens and one positive lens. In the aspect in which the cemented lens of the eyepiece lens of the aspect consists of one negative lens and one positive lens, in a case where a d line-based Abbe number of the positive lens of the cemented lens is denoted by vp, and a d line-based Abbe number of the negative lens of the cemented lens is denoted by vn, it is preferable that Conditional Expression (5) below is satisfied, and it is more preferable that Conditional Expression (5-1) below is satisfied.

$$8 < vp - vn < 25 \tag{5}$$

$$10 < vp - vn < 23 \tag{5-1}$$

In the eyepiece lens of the aspect, in a case where the focal length of the entire system is denoted by f, and a focal length of the second positive lens of the third lens group from the eye side is denoted by f3s, it is preferable that Conditional Expression (6) below is satisfied, and it is more preferable Conditional Expression (6-1) below is satisfied.

$$0.25 < f/f3s < 0.7 \tag{6}$$

$$0.28 < f/f3s < 0.67 \tag{6-1}$$

In the eyepiece lens of the aspect, in a case where a distance from a lens surface of the eyepiece lens closest to the object side to a lens surface of the eyepiece lens closest to the eye side on an optical axis is denoted by L, and the focal length of the entire system is denoted by f, it is preferable that Conditional Expression (7) below is satisfied, and it is more preferable that Conditional Expression (7-1) below is satisfied.

$$1 < L/f < 1.3 \tag{7}$$

$$1.05 < L/f < 1.25 \tag{7-1}$$

In the eyepiece lens of the aspect, it is preferable that a surface of the negative lens of the second lens group on the object side is a concave surface.

In the eyepiece lens of the aspect, the third lens group may be configured to consist of two positive lenses.

In the eyepiece lens of the aspect, the first lens group may be configured to include a positive lens separately from the cemented lens. It is preferable that the first lens group consists of the cemented lens having a positive refractive power as a whole and a single lens having a positive refractive power in order from the object side to the eye side.

An optical apparatus according to another aspect of the present disclosure comprises the eyepiece lens according to the aspect of the present disclosure.

In the present specification, "consist of" or "consisting of" means that a lens that substantially does not have a refractive power, optical elements such as a stop, a filter, and a cover glass other than a lens, and a lens flange, a lens barrel, an imaging element, and the like may be included besides illustrated constituents.

In the present specification, a "~ group having a positive refractive power" means that the entire group has a positive refractive power. Similarly, a "~ group having a negative refractive power" means that the entire group has a negative refractive power. A "lens having a positive refractive power" and a "positive lens" have the same meaning. A "lens having a negative refractive power" and a "negative lens" have the same meaning. A "~ lens group" is not limited to a composition consisting of a plurality of lenses and may have a composition consisting of only one lens.

A compound aspherical lens (a lens that functions as one aspherical lens as a whole by integrally configuring a spherical lens and a film of an aspherical shape formed on the spherical lens) is not regarded as a cemented lens and is treated as one lens. The sign of a refractive power and a surface shape related to a lens including an aspherical surface are considered in a paraxial region unless otherwise specified.

The "focal length" used in the conditional expressions is a paraxial focal length. The "distance on the optical axis" used in the conditional expressions is not an air-equivalent length and will be considered as a geometrical length unless otherwise specified. The values used in the conditional expressions are values in a case based on d line. In the present specification, "d line", "C line", and "F line" are bright lines. The wavelength of d line is 587.56 nanometers (nm). The wavelength of C line is 656.27 nanometers (nm). The wavelength of F line is 486.13 nanometers (nm).

According to the present disclosure, an eyepiece lens that has high optical performance and in which various types of aberration including field curvature and distortion are favorably corrected, and an optical apparatus comprising the eyepiece lens can be provided.

DESCRIPTION OF THE PREFERRED EMBODIMENTS

Figure 1:
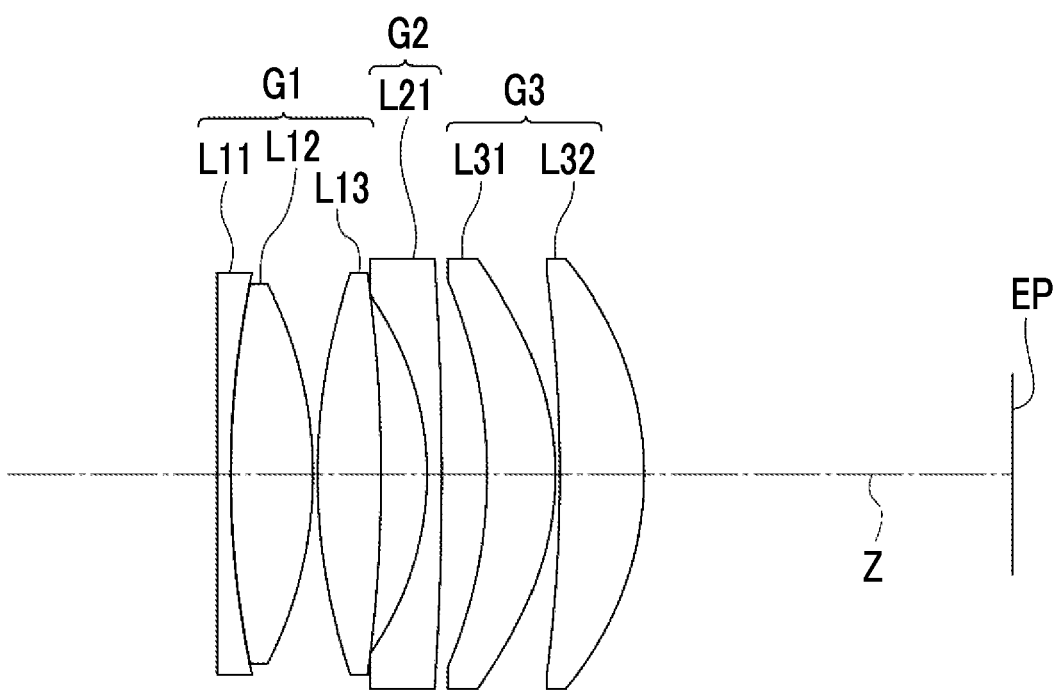
FIG. 1 is a cross-sectional view corresponding to an eyepiece lens of Example 1 of the present disclosure and illustrating a composition of an eyepiece lens according to one embodiment of the present disclosure.

Hereinafter, an embodiment of the present disclosure will be described in detail with reference to the drawings. FIG. 1 illustrates a composition of an eyepiece lens according to one embodiment of the present disclosure in a cross section including an optical axis Z. The example illustrated in FIG. 1 corresponds to Example 1 described later. In FIG. 1, a left side is an object side, and a right side is an eye side. An eyepoint EP illustrated in FIG. 1 does not show a shape and shows a position on the optical axis.

The eyepiece lens consists of a first lens group G1 including a cemented lens, a second lens group G2 consisting of one negative lens, and a third lens group G3 consisting of a plurality of positive lenses in order from the object side to the eye side along the optical axis Z. For example, in the eyepiece lens illustrated in FIG. 1, the first lens group G1 consists of three lenses of a lens L11, a lens L12, and a lens L13 in order from the object side to the eye side. The second lens group G2 consists of one lens of a lens L21. The third lens group G3 consists of two lenses of a lens L31 and a lens L32 in order from the object side to the eye side. However, for the first lens group G1 and the third lens group G3, the number of lenses constituting each lens group can be set to a different number from the example illustrated in FIG. 1.

By including the cemented lens in the first lens group G1, an advantage is achieved in suppression of lateral chromatic aberration. The cemented lens of the first lens group G1 preferably consists of one negative lens and one positive lens. Furthermore, the first lens group G1 may be configured to include a positive lens separately from the cemented lens. In such a case, more positive refractive power can be distributed to the object side. Thus, it is possible to prevent the positive refractive power from being biased to the third lens group G3, and correction of spherical aberration is facilitated.

The first lens group G1 is preferably configured to consist of the cemented lens having a positive refractive power as a whole and a single lens having a positive refractive power in order from the object side to the eye side. In a case where the first lens group G1 consists of two lens components having a positive refractive power, a ray can be gradually bent compared to the ray in a case where the first lens group G1 consists of one lens component having a positive refractive power. Thus, the amount of occurrence of aberration can be reduced, and field curvature can be suppressed. Here, one lens component means one single lens or one cemented lens.

The second lens group G2 is a lens group having a negative refractive power. By having such a composition, adjustment of the Petzval sum is facilitated. Thus, an advantage is achieved in suppression of the field curvature. By configuring the second lens group G2 to consist of one negative lens, an advantage is achieved in size reduction. The surface of the negative lens of the second lens group G2 on the object side is preferably a concave surface. In such a case, an advantage is achieved in suppression of distortion.

In the third lens group G3, by having a composition in which two or more positive lenses are consecutively arranged, a positive refractive power required for the third lens group G3 can be distributed to each lens of the third lens group G3. Thus, an advantage is achieved in suppression of the spherical aberration. In addition, in a case where the third lens group G3 is configured to consist of two positive lenses, an advantage is achieved in size reduction and suppression of the spherical aberration.

Next, configurations related to conditional expressions will be described. In a case where the focal length of the entire system is denoted by f and the focal length of the second lens group G2 is denoted by f2, the eyepiece lens is configured to satisfy Conditional Expression (1) below. The "entire system" means the eyepiece lens. The same point applies in the following description. By setting the range of the negative refractive power of the second lens group G2 positioned almost in the middle of the lens system to satisfy Conditional Expression (1), an advantage is achieved in balanced suppression of both of the field curvature and the distortion. Furthermore, in a case where it is configured that Conditional Expression (1-1) below is satisfied, more favorable characteristics can be achieved.

$$-1.2 < f/f2 < -0.8 \quad (1)$$

$$-1.1 < f/f2 < -0.9 \quad (1\text{-}1)$$

In a case where the focal length of the entire system is denoted by f and the focal length of the positive lens of the third lens group G3 closest to the eye side is denoted by f3e, the eyepiece lens preferably satisfies Conditional Expression (2) below. By setting a corresponding value of Conditional Expression (2) not to be below a lower limit, an advantage is achieved in reduction of the diameter of the lens on the object side from the positive lens of the third lens group G3 closest to the eye side. In addition, an advantage is achieved in maintaining a field of view having an appropriate width. By setting the corresponding value of Conditional Expression (2) not to be above an upper limit, an advantage is achieved in suppression of the field curvature and the distortion. In addition, an advantage is achieved in securing an eye relief having an appropriate length. Furthermore, in a case where it is configured that Conditional Expression (2-1) below is satisfied, more favorable characteristics can be achieved.

$$0.59 < f/f3e < 0.8 \quad (2)$$

$$0.6 < f/f3e < 0.79 \quad (2\text{-}1)$$

In a case where the focal length of the entire system is denoted by f and the focal length of the cemented lens of the first lens group G1 is denoted by fc, the eyepiece lens preferably satisfies Conditional Expression (3) below. By setting the corresponding value of Conditional Expression (3) not to be below the lower limit, more positive refractive power can be distributed to the object side. Thus, it is possible to prevent the positive refractive power from being biased to the third lens group G3, and correction of spherical aberration is facilitated. By setting the corresponding value of Conditional Expression (3) not to be above the upper limit, an advantage is achieved in suppression of the distortion. Furthermore, in a case where it is configured that Conditional Expression (3-1) below is satisfied, more favorable characteristics can be achieved.

$$0.68 < f/fc < 0.95 \quad (3)$$

$$0.7 < f/fc < 0.93 \quad (3\text{-}1)$$

In a case where the focal length of the entire system is denoted by f and the focal length of the third lens group G3 is denoted by f3, the eyepiece lens preferably satisfies Conditional Expression (4) below. By setting the corresponding value of Conditional Expression (4) not to be below the lower limit, an advantage is achieved in reduction of the diameter of the lens on the object side from the third lens group G3. In addition, an advantage is achieved in maintaining the field of view having an appropriate width. By setting the corresponding value of Conditional Expression (4) not to be above the upper limit, an advantage is achieved in suppression of the field curvature and the distortion. Furthermore, in a case where it is configured that Conditional Expression (4-1) below is satisfied, more favorable characteristics can be achieved.

$$0.8 < f/f3 < 1 \quad (4)$$

$$0.82 < f/f3 < 0.98 \quad (4\text{-}1)$$

In an aspect in which the cemented lens of the first lens group G1 consists of one negative lens and one positive lens, in a case where the d line-based Abbe number of the positive lens of the cemented lens of the first lens group G1 is denoted by vp and the d line-based Abbe number of the negative lens of the cemented lens of the first lens group G1 is denoted by vn, the eyepiece lens preferably satisfies Conditional Expression (5) below. By satisfying Conditional Expression (5), an advantage is achieved in suppression of the lateral chromatic aberration. Furthermore, in a case where it is configured that Conditional Expression (5-1) below is satisfied, more favorable characteristics can be achieved.

$$8 < vp - vn < 25 \quad (5)$$

$$10 < vp - vn < 23 \quad (5\text{-}1)$$

In a case where the focal length of the entire system is denoted by f and the focal length of the second positive lens of the third lens group G3 from the eye side is denoted by f3s, the eyepiece lens preferably satisfies Conditional Expression (6) below. By setting the corresponding value of Conditional Expression (6) not to be below the lower limit, an advantage is achieved in reduction of the diameter of the lens on the object side from the second positive lens of the third lens group G3 from the eye side. In addition, an advantage is achieved in maintaining the field of view having an appropriate width. By setting the corresponding value of Conditional Expression (6) not to be above the upper limit, an advantage is achieved in suppression of the field curvature. Furthermore, in a case where it is configured that Conditional Expression (6-1) below is satisfied, more favorable characteristics can be achieved. Furthermore, the value of the upper limit is preferably set to 0.45. The value of the upper limit is more preferably set to 0.42.

$$0.25 < f/f3s < 0.7 \quad (6)$$

$$0.28 < f/f3s < 0.67 \quad (6\text{-}1)$$

In a case where the distance from the lens surface of the eyepiece lens closest to the object side to the lens surface of the eyepiece lens closest to the eye side on the optical axis is denoted by L and the focal length of the entire system is denoted by f, the eyepiece lens preferably satisfies Conditional Expression (7) below. By setting the corresponding value of Conditional Expression (7) not to be below the lower limit, the refractive power of the entire system is not excessively decreased. Thus, an advantage is achieved in securing the field of view having an appropriate width. By setting the corresponding value of Conditional Expression (7) not to be above the upper limit, an advantage is achieved in reduction of the total length of the lens system. Furthermore, in a case where it is configured that Conditional Expression (7-1) below is satisfied, more favorable characteristics can be achieved.

$$1 < L/f < 1.3 \quad (7)$$

$$1.05 < L/f < 1.25 \quad (7\text{-}1)$$

The above preferred configurations and available configurations including the configurations related to the conditional expressions can be randomly combined and preferably, are appropriately selectively employed depending on required specifications. According to the present disclosure, the eyepiece lens that has high optical performance and in which various types of aberration including the field curvature and the distortion are favorably corrected can be implemented.

Next, examples of the eyepiece lens according to the embodiment of the present disclosure will be described.

Example 1

A cross-sectional view illustrating a composition of an eyepiece lens of Example 1 is illustrated in FIG. 1, and the method of illustration is described above. Thus, a duplicate description will be partially omitted here. The eyepiece lens of Example 1 consists of the first lens group G1 having a positive refractive power, the second lens group G2 having a negative refractive power, and the third lens group G3 having a positive refractive power in order from the object side to the eye side. The first lens group G1 consists of the lens L11, the lens L12, and the lens L13 in order from the object side to the eye side. The second lens group G2 consists of the lens L21. The third lens group G3 consists of the lens L31 and the lens L32 in order from the object side to the eye side. Above is the summary of the eyepiece lens of Example 1.

For the eyepiece lens of Example 1, fundamental lens data is shown in Table 1, specifications are shown in Table 2, and aspherical coefficients are shown in Table 3. In Table 1, the column of Sn shows a surface number in a case where the surface closest to the object side is a first surface and the number is increased by one at a time in a direction toward the eye side. The column of R shows the radius of curvature of each surface. The column of D shows a surface interval on the optical axis between each surface and a surface adjacent thereto on the eye side. The column of Nd shows the refractive index of each constituent with respect to d line. The column of vd shows the d line-based Abbe number of each constituent.

In Table 1, the sign of the radius of curvature of a surface having a shape of a convex surface toward the object side is positive, and the sign of the radius of curvature of a surface having a shape of a convex surface toward the eye side is negative. In Table 1, the surface number and a word (EP) are written in the column of the surface number of the surface corresponding to the eyepoint EP.

Table 2 shows the focal length f of the entire system, a pupil diameter, and the value of the field of view based on d line. The pupil diameter shown in Table 2 is the value of the diameter of a pupil.

In Table 1, the surface number of an aspherical surface is marked with *, and the numerical value of the paraxial radius of curvature is written in the column of the radius of curvature of the aspherical surface. In Table 3, the column of Sn shows the surface number of the aspherical surface, and the columns of KA and Am (m=4, 6, 8, and 10) show the numerical value of the aspherical coefficient for each aspherical surface. In the numerical value of the aspherical coefficient in Table 3, "E±n" (n: integer) means "×10±n". KA and Am are aspherical coefficients in an aspherical expression represented by the following expression.

$$Zd = C \times h2/\{1+(1-KA \times C2 \times h2)^{1/2}\} + \Sigma Am \times hm$$

where

Zd: aspherical depth (the length of a perpendicular line drawn from a point on an aspherical surface having a height h to a plane that is in contact with an aspherical vertex and is perpendicular to the optical axis Z)

h: height (a distance from the optical axis to the lens surface)

C: reciprocal of paraxial radius of curvature

KA and Am: aspherical coefficients

In the aspherical expression, Σ means the total sum related to m.

In the data of each table, degree is used as the unit of angle, and mm (millimeter) is used as the unit of length. However, since the optical system can be used even in a case where propositional enlargement or propositional reduction is performed, other appropriate units can also be used. In addition, numerical values that are rounded to a predetermined number of digits are written in each table shown below.

TABLE 1

| | Example 1 | | | |
|---|---|---|---|---|
| Sn | R | D | Nd | vd |
| 1 | ∞ | 0.9200 | 2.00100 | 29.13 |
| 2 | 68.5300 | 5.5800 | 1.85150 | 40.78 |
| 3 | −30.0642 | 0.3100 | | |
| 4 | 45.0543 | 4.3100 | 1.67790 | 55.34 |
| 5 | −108.4282 | 3.1170 | | |
| 6 | −22.2654 | 1.0000 | 1.92286 | 20.88 |
| 7 | −234.0865 | 3.0800 | | |
| 8 | −35.3360 | 4.6000 | 1.53114 | 55.43 |
| *9 | −21.1717 | 0.3000 | | |
| 10 | −109.9133 | 5.7200 | 1.67790 | 55.34 |
| 11 | −23.7509 | 25.0000 | | |
| 12 (EP) | ∞ | | | |

TABLE 2

| Example 1 | |
|---|---|
| f | 26.68 |
| Diameter of Pupil | 14.00 |
| Field of View | 38.8 degrees |

TABLE 3

| Example 1 | |
|---|---|
| Sn | 9 |
| KA | 1.0000000E+00 |
| A4 | 1.3035549E−05 |
| A6 | 3.1040444E−09 |
| A8 | 1.0598290E−10 |
| A10 | 3.5090263E−14 |

Figure 3:
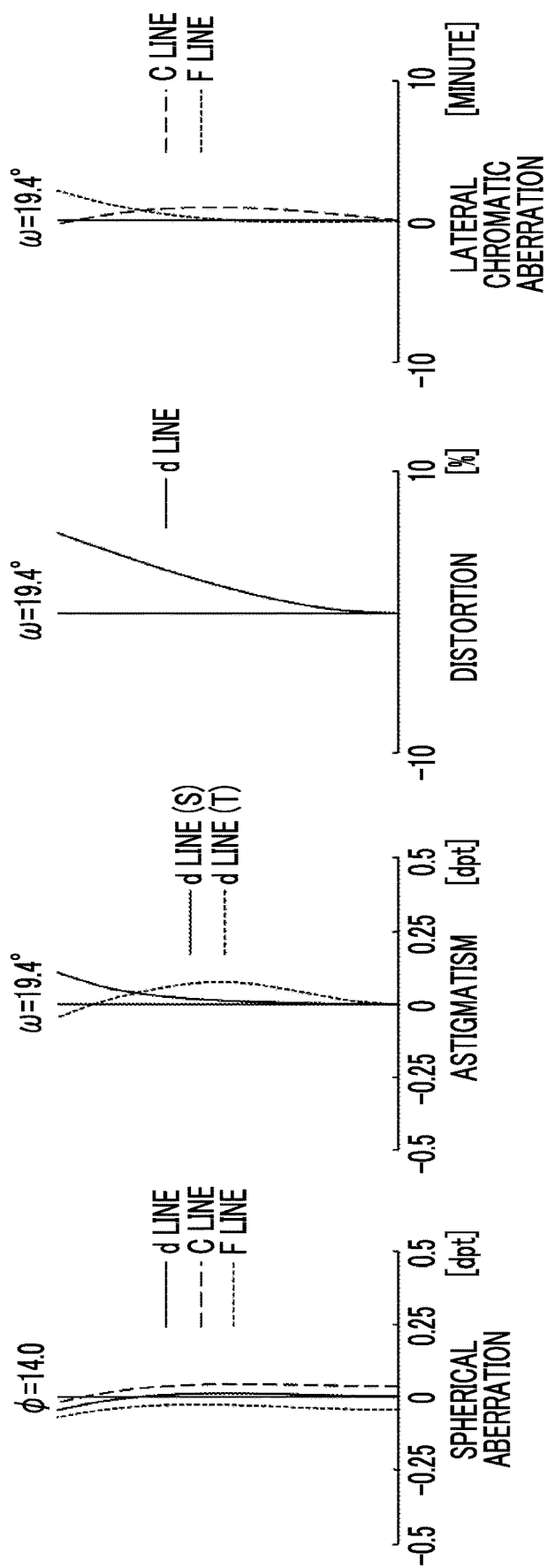
FIG. 3 is each aberration diagram of the eyepiece lens of Example 1 of the present disclosure.

FIG. 3 illustrates each aberration diagram of the eyepiece lens of Example 1. In FIG. 3, in order from the left, spherical aberration, astigmatism, distortion, and lateral chromatic aberration are illustrated. In the spherical aberration diagram, a solid line, a long broken line, and a short broken line illustrate aberration on d line, C line, and F line, respectively. In the astigmatism diagram, a solid line illustrates aberration on d line in a sagittal direction, and a short broken line illustrates aberration on d line in a tangential direction. In the distortion diagram, a solid line illustrates aberration on d line. In the lateral chromatic aberration diagram, a long broken line and a short broken line illustrate aberration on C line and F line, respectively. In the spherical aberration diagram, φ is the diameter of the pupil. In the other aberration diagrams, w is the angle of half of the field of view. The unit of the horizontal axis in the spherical aberration diagram and the astigmatism diagram is a diopter, and the unit of the horizontal axis in the lateral chromatic aberration diagram is a minute of angle. In FIG. 3, an aberration diagram in a case where an object having a concave surface of a radius of curvature of 40 millimeters (mm) toward the eye side is assumed and the distance from the object to the lens surface closest to the object side on the optical axis is 11.38 is illustrated.

Symbols, meanings, writing methods, and illustration methods of each data related to Example 1 are the same in the following examples unless otherwise specified. Thus, duplicate descriptions will be omitted below.

Example 2

Figure 2:
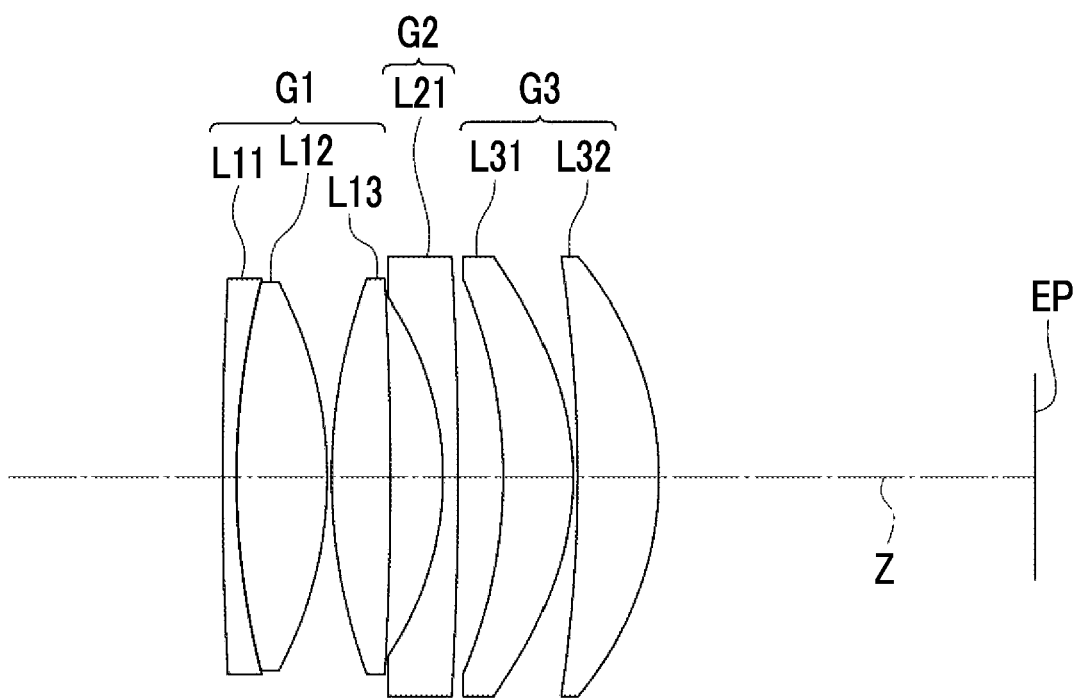
FIG. 2 is a cross-sectional view illustrating a composition of an eyepiece lens of Example 2 of the present disclosure.
Figure 4:
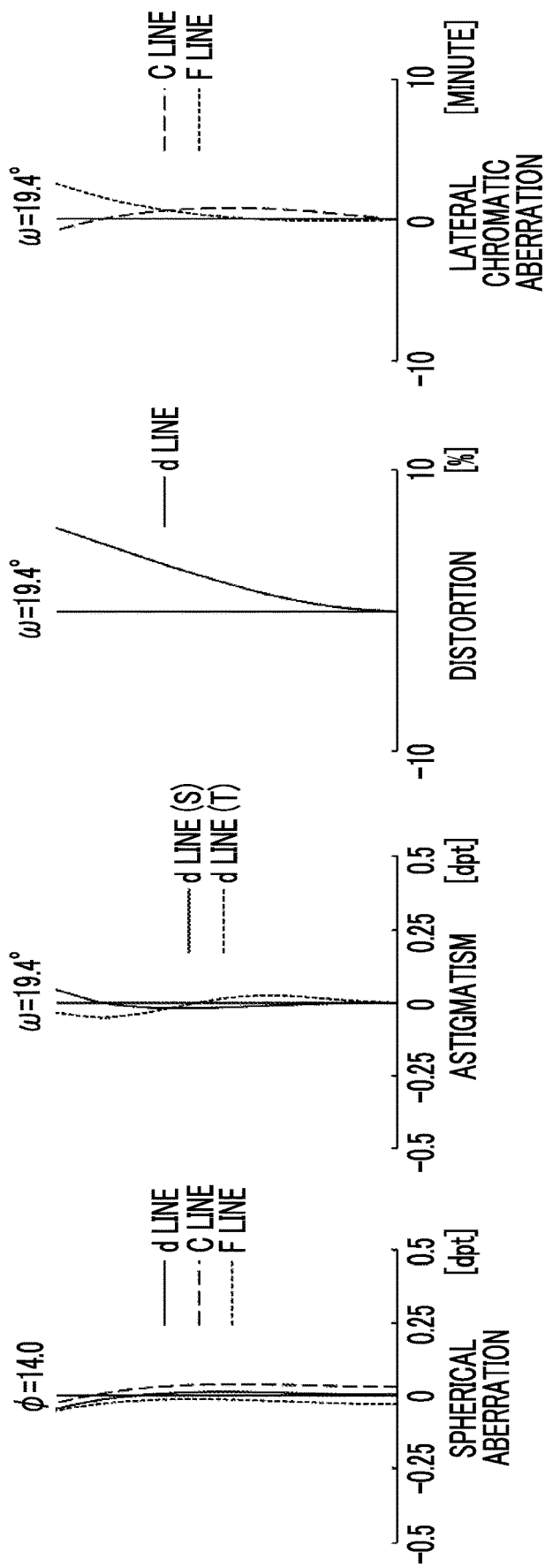
FIG. 4 is each aberration diagram of the eyepiece lens of Example 2 of the present disclosure.

FIG. 2 illustrates a cross-sectional view illustrating a composition of an eyepiece lens of Example 2. The eyepiece lens of Example 2 has the same composition as the summary of the eyepiece lens of Example 1. For the eyepiece lens of Example 2, fundamental lens data is shown in Table 4, specifications are shown in Table 5, aspherical coefficients are shown in Table 6, and each aberration diagram is illustrated in FIG. 4. In FIG. 4, an aberration diagram in a case where an object having a concave surface of a radius of curvature of 40 millimeters (mm) toward the eye side is assumed and the distance from the object to the lens surface closest to the object side on the optical axis is 11.69 is illustrated.

TABLE 4

Example 2

| Sn | R | D | Nd | vd |
|---|---|---|---|---|
| 1 | 256.8338 | 0.9297 | 2.00100 | 29.13 |
| 2 | 55.0213 | 6.0249 | 1.83481 | 42.74 |
| 3 | −28.8692 | 0.2998 | | |
| 4 | 40.1309 | 3.8984 | 1.63854 | 55.38 |
| 5 | −245.9724 | 3.4963 | | |
| 6 | −22.3245 | 1.0000 | 1.92286 | 20.88 |
| 7 | −270.0000 | 3.0000 | | |
| 8 | −35.3360 | 4.6000 | 1.53114 | 55.43 |
| *9 | −21.1717 | 0.2998 | | |
| 10 | −103.9649 | 5.4035 | 1.67790 | 55.34 |
| 11 | −23.5865 | 25.0000 | | |
| 12 (EP) | ∞ | | | |

TABLE 5

Example 2

| | |
|---|---|
| f | 26.68 |
| Diameter of Pupil | 14.00 |
| Field of View | 38.8 degrees |

TABLE 6

Example 2

| Sn | 9 |
|---|---|
| KA | 1.0000000E+00 |
| A4 | 1.3035549E−05 |
| A6 | 3.1040444E−09 |
| A8 | 1.0598290E−10 |
| A10 | 3.5090263E−14 |

Table 7 shows the corresponding values of Conditional Expressions (1) to (7) of the eyepiece lenses of Example 1 and Example 2. In Example 1 and Example 2, d line is used as a reference wavelength. Table 7 shows d line-based values.

TABLE 7

| Expression Number | | Example 1 | Example 2 |
|---|---|---|---|
| (1) | f/f2 | −0.998 | −1.010 |
| (2) | f/f3e | 0.613 | 0.609 |
| (3) | f/fc | 0.702 | 0.791 |
| (4) | f/f3 | 0.908 | 0.905 |
| (5) | vp − vn | 11.65 | 13.61 |
| (6) | f/f3s | 0.298 | 0.298 |
| (7) | L/f | 1.085 | 1.085 |

As is perceived from the above data, in the eyepiece lenses of Example 1 and Example 2, various types of aberration including the field curvature and the distortion are favorably corrected, and high optical performance is implemented. In addition, the pupil diameter is 14.0 mm, and the eyepiece lenses have a large pupil diameter. The eyepiece lenses of Example 1 and Example 2 have a large pupil diameter, and the field curvature and the distortion are favorably corrected. Thus, even in a case where the center of the pupil of an observer is shifted from the optical axis Z of the eyepiece lens due to vibration and the like, a high quality image can be observed.

Figure 5:
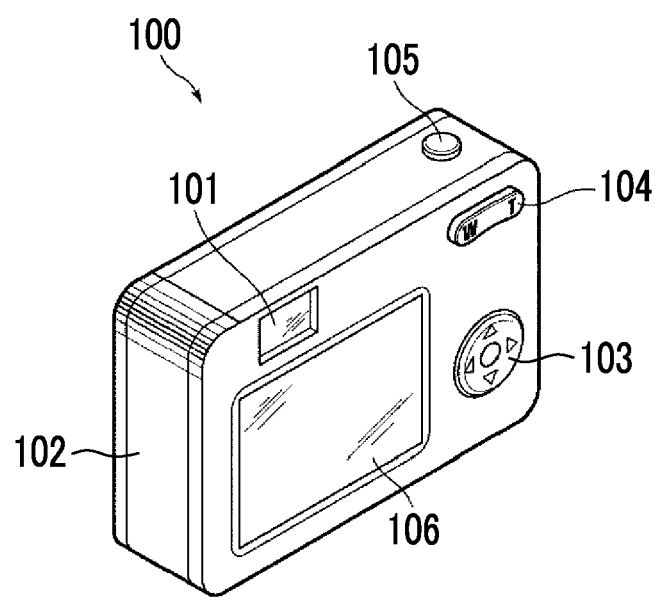
FIG. 5 is a perspective view of a rear surface side of an optical apparatus according to one embodiment of the present disclosure.

Next, an optical apparatus according to the embodiment of the present disclosure will be described. FIG. 5 is a perspective view illustrating a schematic configuration of a rear surface side of a camera 100 which is the optical apparatus according to one embodiment of the present disclosure. The camera 100 comprises an eyepiece lens 101 according to one embodiment of the present disclosure in the upper portion of a camera body 102.

The camera 100 comprises an operation button 103 for performing various types of setting, a zoom lever 104 for performing variable magnification, and a monitor 106 displaying images and various setting screens on the rear surface of the camera body 102, and comprises a shutter button 105 on the upper surface of the camera body 102. In addition, the camera 100 comprises an imaging lens (not illustrated) on the front surface of the camera body 102 and comprises an imaging element (not illustrated) capturing a subject image formed by the imaging lens inside the camera body 102. A user observes the subject image by looking through the eyepiece lens 101 from the rear surface side.

While the technology of the present disclosure has been illustratively described with the embodiment and the examples, the technology of the present disclosure is not limited to the embodiment and the examples and can be subjected to various modifications. For example, the radius of curvature, the surface interval, the refractive index, the Abbe number, the aspherical coefficient, and the like of each lens are not limited to the values shown in each example and may have other values.

While an example of the eyepiece lens incorporated in the camera 100 is illustrated in FIG. 5, the technology of the present disclosure can be applied to an eyepiece lens externally attached to the optical apparatus. In addition, the technology of the present disclosure can be applied to an eyepiece lens for a display image observation apparatus. For example, application may be made to an eyepiece lens that is arranged in an eyepiece unit of a night vision optical apparatus and is used for observing an image on an image display surface of an image multiplier tube. Furthermore, the optical apparatus according to the embodiment of the present disclosure is not limited to the above example and can have various aspects of a video camera and the like.

What is claimed is:

1. An eyepiece lens consisting of, in order from an object side to an eye side:
   a first lens group including a cemented lens;
   a second lens group consisting of one negative lens; and
   a third lens group consisting of a plurality of positive lenses,
   wherein in a case where a focal length of the eyepiece lens is denoted by f, and a focal length of the second lens group is denoted by f2, Conditional Expression (1) represented by $$-1.2<f/f2<-0.8 \tag{1}$$

is satisfied.
2. The eyepiece lens according to claim 1,
   wherein in a case where a focal length of the positive lens of the third lens group closest to the eye side is denoted by f3e, Conditional Expression (2) represented by $$0.59<f/f3e<0.8 \tag{2}$$

is satisfied.
3. The eyepiece lens according to claim 2,
   wherein Conditional Expression (2-1) represented by $$0.6<f/f3e<0.79 \tag{2-1}$$

is satisfied.
4. The eyepiece lens according to claim 1,
   wherein in a case where a focal length of the cemented lens is denoted by fc, Conditional Expression (3) represented by $$0.68<f/fc<0.95 \tag{3}$$

is satisfied.
5. The eyepiece lens according to claim 4,
   wherein Conditional Expression (3-1) represented by $$0.7<f/fc<0.93 \tag{3-1}$$

is satisfied.
6. The eyepiece lens according to claim 1,
   wherein in a case where a focal length of the third lens group is denoted by f3, Conditional Expression (4) represented by $$0.8<f/f3<1 \tag{4}$$

is satisfied.
7. The eyepiece lens according to claim 6,
   wherein Conditional Expression (4-1) represented by $$0.82<f/f3<0.98 \tag{4-1}$$

is satisfied.
8. The eyepiece lens according to claim 1,
   wherein the cemented lens consists of one negative lens and one positive lens.
9. The eyepiece lens according to claim 8,
   wherein in a case where a d line-based Abbe number of the positive lens of the cemented lens is denoted by vp, and a d line-based Abbe number of the negative lens of the cemented lens is denoted by vn, Conditional Expression (5) represented by $$8<vp-vn<25 \tag{5}$$

is satisfied.
10. The eyepiece lens according to claim 9,
    wherein Conditional Expression (5-1) represented by $$10<vp-vn<23 \tag{5-1}$$

is satisfied.
11. The eyepiece lens according to claim 1,
    wherein in a case where a focal length of the second positive lens of the third lens group from the eye side is denoted by f3s, Conditional Expression (6) represented by $$0.25<f/f3s<0.7 \tag{6}$$

is satisfied.
12. The eyepiece lens according to claim 11,
    wherein Conditional Expression (6-1) represented by $$0.28<f/f3s<0.67 \tag{6-1}$$

is satisfied.
13. The eyepiece lens according to claim 1,
    wherein in a case where a distance from a lens surface of the eyepiece lens closest to the object side to a lens surface of the eyepiece lens closest to the eye side on an optical axis is denoted by L, Conditional Expression (7) represented by $$1<L/f<1.3 \tag{7}$$

is satisfied.
14. The eyepiece lens according to claim 13,
    wherein Conditional Expression (7-1) represented by $$1.05<L/f<1.25 \tag{7-1}$$

is satisfied.
15. The eyepiece lens according to claim 1,
    wherein a surface of the negative lens of the second lens group on the object side is a concave surface.
16. The eyepiece lens according to claim 1,
    wherein the third lens group consists of two positive lenses.
17. The eyepiece lens according to claim 1,
    wherein the first lens group includes a positive lens separately from the cemented lens.
18. The eyepiece lens according to claim 1,
    wherein the first lens group consists of the cemented lens having a positive refractive power as a whole and a single lens having a positive refractive power in order from the object side to the eye side.
19. The eyepiece lens according to claim 1,
    wherein Conditional Expression (1-1) represented by $$-1.1<f/f2<-0.9 \tag{1-1}$$

is satisfied.
20. An optical apparatus comprising:
    the eyepiece lens according to claim 1.

* * * * *